United States Patent [19]

Lussiez

[11] Patent Number: 4,519,606
[45] Date of Patent: May 28, 1985

[54] SPELLING GAME

[76] Inventor: Guy W. Lussiez, P.O. Box 110, Rte. 3, Golden, Colo. 80401

[21] Appl. No.: 401,619

[22] Filed: Jul. 26, 1982

[51] Int. Cl.³ .............................................. A63F 9/18
[52] U.S. Cl. ..................................... 273/1 R; 434/167
[58] Field of Search ................. 273/1 R, 1 E, 1 M; 434/167–176

[56] References Cited

U.S. PATENT DOCUMENTS

| 3,388,909 | 6/1968 | Woods | 273/1.5 R |
| 3,544,109 | 1/1970 | Woods | 273/1.5 R |
| 3,618,231 | 11/1971 | Nason | 434/167 X |
| 3,823,492 | 7/1974 | Allain | 434/170 |
| 3,885,326 | 5/1975 | Robinson et al. | 434/170 |
| 4,189,779 | 2/1980 | Brautingham | 434/176 X |
| 4,306,725 | 12/1981 | Sawyer | 434/170 X |
| 4,308,017 | 12/1981 | Laughon et al. | 434/169 |

OTHER PUBLICATIONS

U.S.A. Today, 6/4/84, p. 3.
Reader's Digest Book of 1000 Family Games, 6–1973, p. 97, "Spelling Bee".

Primary Examiner—Paul E. Shapiro

[57] ABSTRACT

A spelling game in which words are randomly selected from a storage device and spelled by one or more players. The words are subdivided according to difficulty. A first player selects a difficulty level and a word is randomly selected from the appropriate section of storage. The word is pronounced and defined by a second player. The first player then spells the word. Other players may then contest the spelling and spell the word. Points appropriate to the difficulty level are added to the score of players who correctly spell the word and are subtracted from the score of players who incorrectly spell the word. The process is repeated with each player having an opportunity to be the first speller.

4 Claims, 5 Drawing Figures

164

◐ 1    GLUM    (glum)  a. sullen; moody; morose.

◐ 2    GLUT    (glut)  v.t. overindulge; to fill to excess.

◒ 1    GLUTEN    (gloo'.ten) n. the protein of wheat and other cereals.

● 1    GLUTTON    (glut'.n) n. one who eats too much; (Fig.) one eager for anything
                      in excess, e.g. work, books, etc; carnivore of
                      weasel family, wolverine.

● 2    GLYCERINE    (glis'.er.in) n. a sweet, colorless, odorless, syrupy liquid.

● 3    GLYCOGEN    (glī'.ka.jin) n. the form in which the body stores carbohydra-
                      tes (starch); animal starch.

◐ 1    GLYCOL    (glī'.kōl) n. an artificial compound linking glycerine and
                      alcohol used as an antifreeze.

● 4    GLYPH    (glif) n. a shallow vertical channel or carved fluting.

○ 2    GLYPTIC    (glip'.tik) a. pert. to carving, esp. on gems.

◒ 3    GNAR    (nar) v.i. to growl; to snarl.

◐ 2    GNAT    (nat) n. a kind of small biting insect.

● 5    GNEISS    (nīs) n. a metamorphic rock similar to granite.

◐ 3    GOAL    (gōl) n. an object of effort; an end or aim; in a race, the winning
                      post; in football, hockey, etc., the space marked by two
                      upright posts and a cross-bar; the act of kicking or
                      driving the ball between these posts.

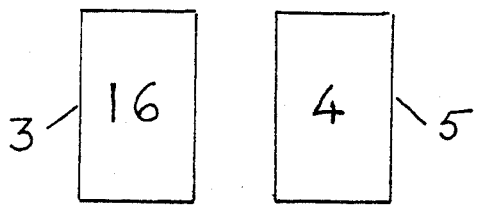

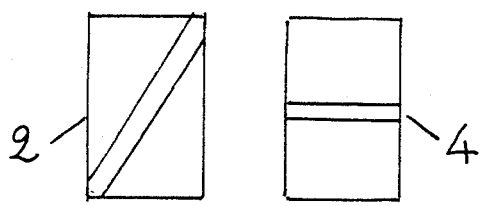

FIGURE 1

SPELLING GAME

SUMMARY OF THE INVENTION

The subject of the invention is a spelling game in which words are randomly selected from a word storage and spelled by one or more players.

The pronunciation and one or more definitions of each word is given in the same storage or a different storage. The word is then either pronounced according to the pronunciation given in the storage by a person who is not playing the game, a player whose turn it is not to play, a talking device; or the pronunciation given in the storage is displayed so that it can be read by the player or players. The definition or definitions of the word can also be read aloud or displayed in a manner similar to the pronunciation of the word described above. The player or players must then spell the word. Points, chips, etc are then awarded to the player or players who spelled the word correctly. Points, chips, etc can be taken away from a player or players who spelled the word incorrectly.

DESCRIPTION OF THE DRAWING

FIG. 1 shows apparatus for playing a spelling game.

DETAILS OF THE INVENTION

Figure 2:
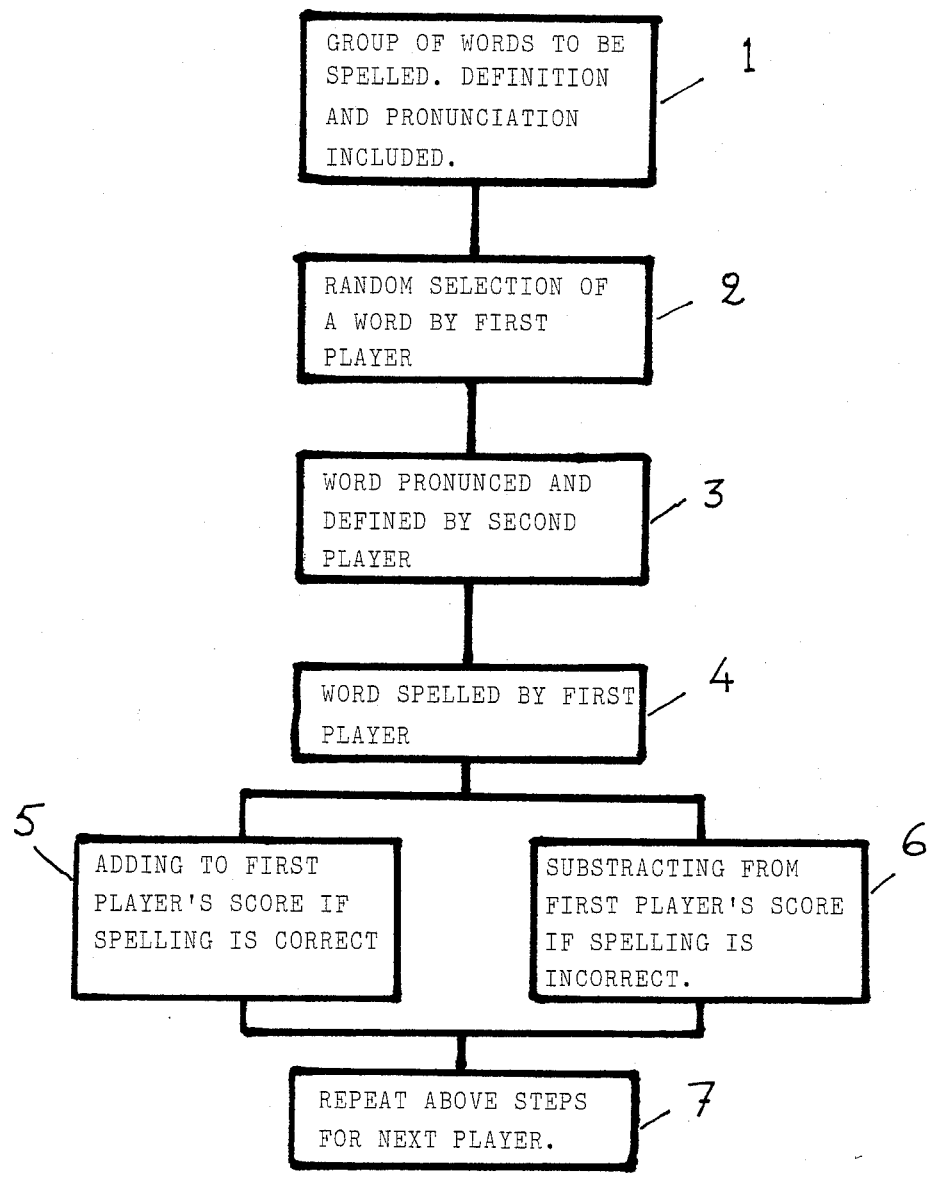
FIGS. 2-5 are flow charts showing the steps of playing spelling games.
Figure 3:
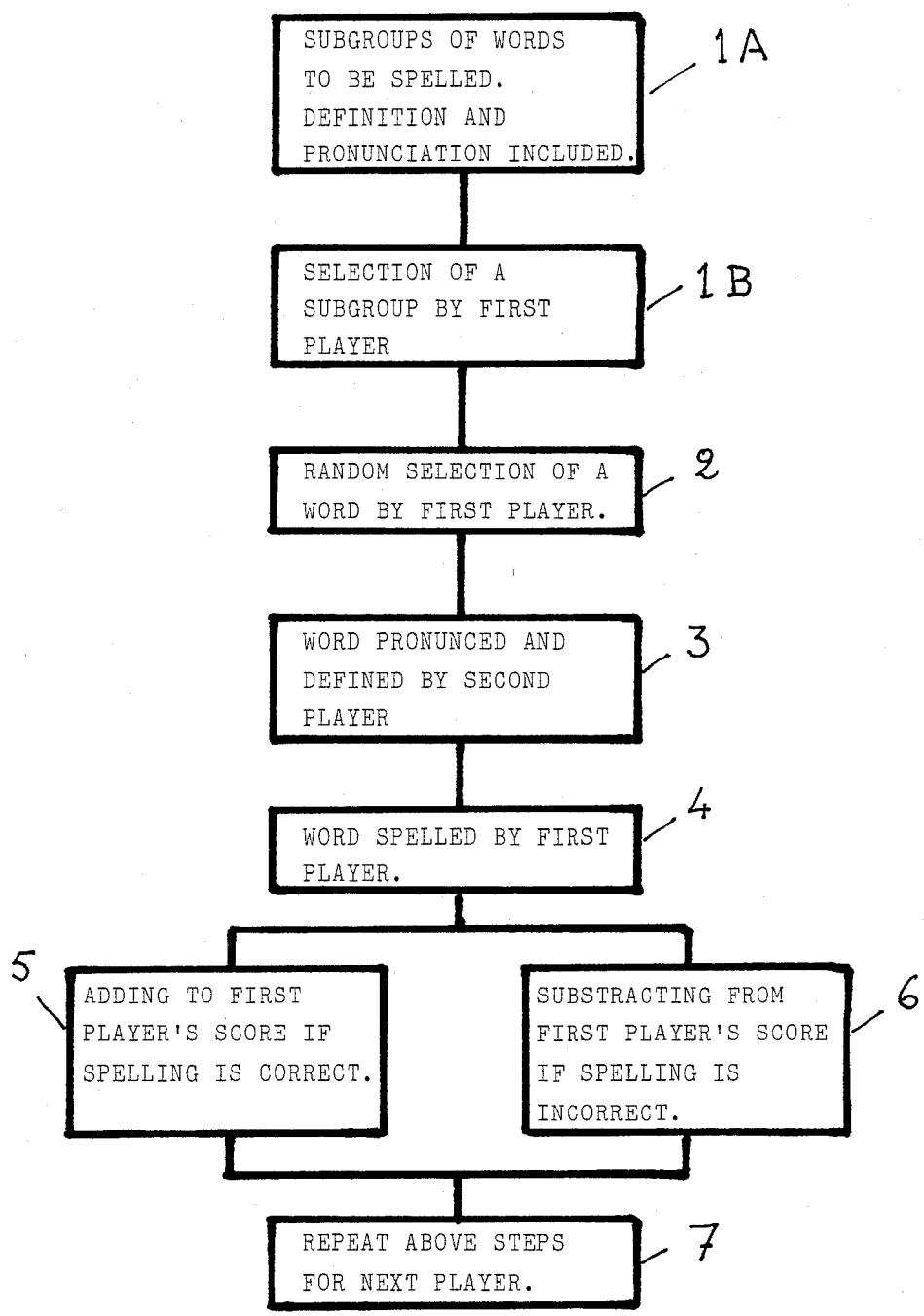
Figure 4:
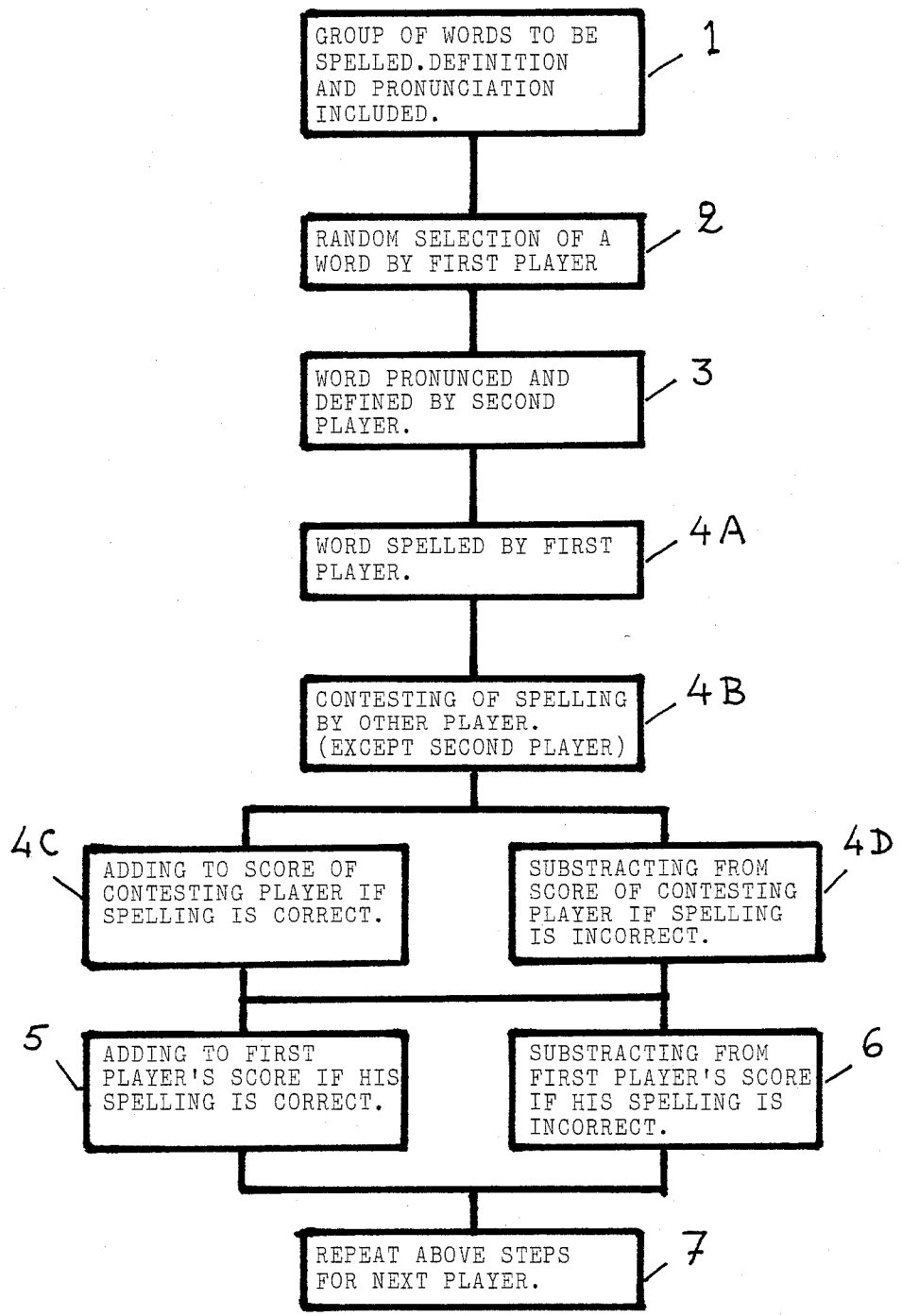
Figure 5:
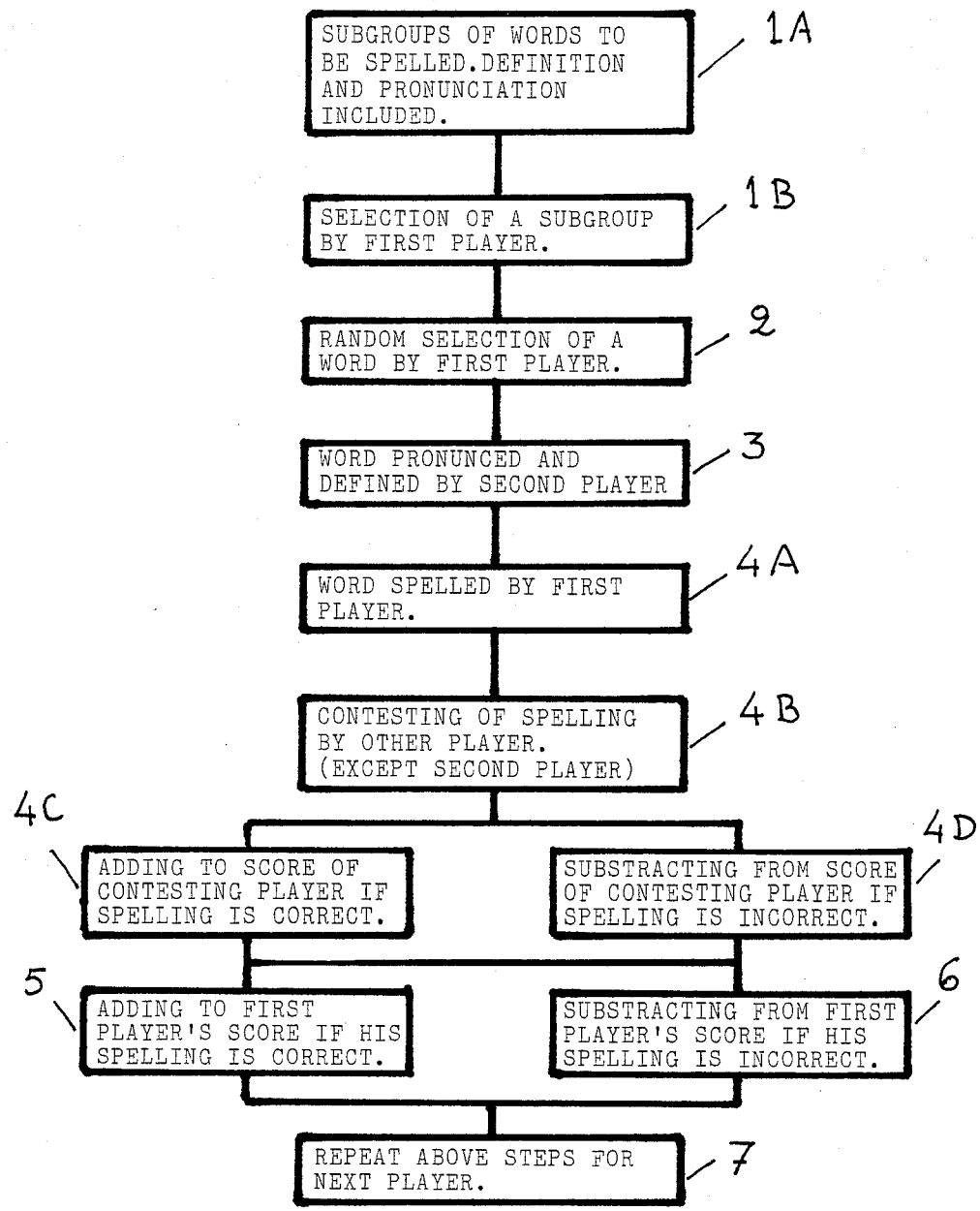

The subject of the invention is a spelling game in which words are randomly selected from a word storage and spelled by one or more players.

Each word from the storage is assigned an indicium such as a number, a letter, a color, etc; which is used for the random selection of the words. The words can be listed in a book, for example a dictionary, in which case each page may also bear an indicium which is used for the random selection of the words. The words can be listed on cards which then may also bear indicia. Other types of indexed word storages may also be used such as films, electronic memories, optical memories, etc.

The list of words may have one or more levels of spelling difficulty. If the list includes many levels of difficulty, each level is identified through the use of indicia specifies to this level. One or more lists can also be used to differentiate various levels of difficulty. In this case each list is identified through the use of indicia specific to this list.

Each word stored can be associated on the same list with its pronunciation and one or more definitions as is often done in dictionaries or the pronunciation and one or more definitions may also be stored in a different storage. In this last case the indicia which permit the selection of the word and the indicia attached to its pronounciation and definition or definitions are identical.

A means of randomly selecting words is part of the game. For example if an indexed dictionary is used, the page number and the word number can be drawn from one or more decks of cards. Other means such as dice, roulette, electronic device can be used.

The word that has been randomly selected is then pronounced, and possibly the definition or definitions are read aloud, according to the pronunciation and definition or definitions given by the list. This can be done by a person not playing, or by a player whose turn it is not to play, or by a talking device. The pronunciation and possibly the definition or definitions can also be displayed so that they can be read by the player or players.

The player or players must then spell the word that has been selected. A number of points, chips. etc, is awarded to the player or players who spelled the word correctly. The number of points, chips, etc can be a function of the level difficulty chosen. A number of points, chips, etc, can be taken away from a player or players who did not spell the word correctly. The purpose of the game is to accumulate a maximum number of points, chips, etc. Another purpose of the invention is as an educational tool to teach the spelling of words.

Some examples of the game are given below for the purpose of clarity.

EXAMPLE 1

A dictionary is used in which the pronunciation of each word and one or more definitions are given. Each page of said dictionary is numbered. Each word on a page is also numbered, the level of spelling difficulty being indicated by a symbol as shown in FIG. 1. For example, words corresponding to a level 1 which on the figure is a circle with one black quarter, are numbered 1 to n. Words corresponding to a level 2, which on the figure is a circle with two black quarters, are numbered 1 to p, etc.

The player whose turn it is to play, player A, chooses the level of difficulty he wants and indicates this level to the other players. He then pulls a card from each one of two decks. These cards indicate the page number of the dictionary as shown in FIG. 1. Another player, player B, opens the dictionary to this page number and indicates the number of words of this page corresponding to the level of difficulty chosen by player A, for example 7. Player A then chooses a number between 1 and 7, and player B reads aloud the corresponding word according to the pronunciation given next to it and also the definition or definitions if requested by player A. Player A then must spell the word.

If player A spelled the word correctly, he is awarded a number of points corresponding to the level of difficulty.

The above process is repeated for the next player. Each player plays a given number of turns, the winner being the player with the highest number of points.

Above game can be played in a slightly different way. The level of difficulty assigned to each player for each turn can be determined by pulling a card from another deck. When the game includes players of different abilities (i.e. children and adults) it may be agreed that some players will have to choose from the more difficult levels.

Another slightly different way of playing the above game would be that after player A spelled the word, each other player except player B can contest the spelling and gives his own spelling. The player who contested the spelling is awarded the points if he is right, but points are taken away from him if he is wrong.

EXAMPLE 2

Words are listed on cards with the pronunciation and the definition or definitions. There is the same number of words on each card, for example 10. The level of spelling difficulty on a given card is the same for each word and is characterized by a color. All cards with the same color are arranged in a deck. There is then as many decks as the number of levels of difficulty.

Each deck is arranged in a box which has a window. The word cannot be seen by the players, but the pronunciation and the definition or definitions and the word number are visible through the window. A player pulls a card from another deck. The cards on this deck are printed with one number between 1 and 10 and one of the colors corresponding to the various levels of difficulty. The card pulled refers every player to the word deck with the same color and to the word bearing the same number on the card visible through the window. Each player spells the word on a sheet of paper. The spelling of each player is then compared with the spelling on the card by pulling the card out of the box. Each player who has spelled the word correctly is awarded points. The used card is placed at the bottom of the deck.

Above game can also be played in a slightly different manner. Each player can play in turn and choose a level of spelling difficulty as in Example 1.

EXAMPLE 3

The words with the pronunciation and the definition or definitions are held in the memory of an electronic device, or on discs, cards or tapes which can then adapt to this device. The level of difficulty can be chosen either by pushing a button on the device or by using the adequate disc, card or tape.

When a player is ready to play, he pushes a button and the electronic device randomly chooses a word. The pronunciation and the definition or definitions are displayed on a screen. The player then spells the word by typing it on a typing board attached to the device. The device then displays the typed word, the exact spelling in the memory or on the disc, card, or tape, and the number of points credited to this player.

As a variation to the above game, each player can have a typing board and each individual spelling is displayed either on a common display device or on individual display devices. For example this could be used on a television spelling game.

As another variation to the above game each player writes the spelling on a sheet of paper. The device displays the correct spelling after the pronunciation and definition or definitions have been displayed for a given time, for example one minute.

EXAMPLE 4

The words are stored in a book and the pronunciation and the definition or definitions are stored in as many identical books as there is of players. The indicia are identical in each book so that to one indicium corresponds one word in the book used for storing the words and the pronunciation and definition or definitions of said word in the other books. Various levels of spelling difficulty are indicated by different types of indicia in each book. After a level of difficulty has been chosen, an indicium is randomly drawn and each player reads the pronunciation and definition or definitions corresponding to this indicium in the book used for storing said pronunciation and definition or definitions. Each player then spells the word on a sheet of paper and each spelling is compared with the spelling corresponding to the same indicium given in the book where the words are stored. Players are then awarded points if they spelled the word correctly.

Other variations of playing this game within the scope of the claims are part of the invention.

What is claimed is:

1. A method of playing a spelling game for a plurality players comprising the steps of
    (A) Providing a group of words to be spelled, each word having associated therewith its definition and pronunciation,
    (B) Randomly selecting a word from said group by a first player of said plurality,
    (C) Giving the pronunciation and definition of said selected word to said first player by a second player,
    (D) Spelling said word by said first player,
    (E) Adding to a score for said first player if the spelling is correct,
    (F) Substracting from a score for said first player if the spelling is incorrect, and
    (G) Repeating the steps for each player.

2. The method of claim 1 comprising the steps of:
    (H) Contesting the spelling by the first player before adding or substracting from the score of said first player, by any of said players except said second player,
    (I) Spelling said word by said contesting player,
    (J) Adding to a score for said contesting player if the spelling by said contesting player is correct, and
    (K) Substracting from a score for said contesting player if the spelling by said contesting player is incorrect.

3. The method of claim 1 wherein the step of providing a group of words includes the step of categorizing said words into subgroups according to the level of spelling difficulty,
    (L) Selecting a subgroup by said first player prior to said step of randomly selecting,
    (M) Said step of randomly selecting a word from said group comprising randomly selecting a word from the selected subgroup, and
    (N) Prior to adding a score determining the amount of score to be added as a function of the subgroup selected.

4. The method of claim 3 further comprising the steps of;
    (H) Contesting the spelling by the first player before adding to or substracting from the score of said first player, by any of said players except said second player,
    (I) Spelling said word by said contesting player, and after said step of determining the amount of score
    (J) Adding to the score of said contesting player if the spelling by said contesting player is correct, and
    (K) Substracting from the score of said contesting player if the spelling by said contesting player is incorrect.

* * * * *